United States Patent [19]

Teratani et al.

[11] Patent Number: 4,984,166
[45] Date of Patent: Jan. 8, 1991

[54] AUTOMOTIVE CONSTANT SPEED CRUISE CONTROL SYSTEM

[75] Inventors: Tatsuo Teratani; Takeshi Tachibana; Shigetaka Akabori; Masumi Nagasaka; Hiroaki Tabuchi, all of Toyota; Junji Takahashi, Kobe; Akira Miyazaki, Kobe; Masaki Hitotsuya, Kobe; Minoru Takahashi, Kobe, all of Japan

[73] Assignees: Toyota Jidosha Kabushiki Kaisha, Aichi; Fujitsu Ten Limited, Hyogo, both of Japan

[21] Appl. No.: 348,098

[22] Filed: May 2, 1989

Related U.S. Application Data

[63] Continuation of Ser. No. 948,135, Dec. 29, 1986, abandoned.

[30] Foreign Application Priority Data

| Dec. 27, 1985 | [JP] | Japan | 60-298126 |
| Dec. 27, 1985 | [JP] | Japan | 60-298128 |
| Dec. 27, 1985 | [JP] | Japan | 60-298129 |
| Dec. 28, 1985 | [JP] | Japan | 60-298847 |
| Dec. 28, 1985 | [JP] | Japan | 60-298848 |

[51] Int. Cl.⁵ .................................. B60K 31/04
[52] U.S. Cl. ........................... 364/426.04; 364/424.1; 364/431.07; 180/179
[58] Field of Search ................ 364/426.04, 431.07, 364/424.1; 180/175–179; 74/866; 123/352

[56] References Cited

U.S. PATENT DOCUMENTS

| 3,748,641 | 7/1973 | Hartung | 180/179 |
| 3,998,191 | 12/1976 | Beyerlein et al. | 180/176 X |
| 4,421,192 | 12/1983 | Ito et al. | 74/866 |
| 4,439,833 | 3/1984 | Yamaguchi et al. | 180/179 |
| 4,451,890 | 5/1984 | Suzuki et al. | 364/426 |
| 4,463,822 | 8/1984 | Tanigawa et al. | 180/179 |
| 4,560,024 | 12/1985 | Noda et al. | 180/176 |
| 4,658,929 | 4/1987 | Katou et al. | 180/175 |
| 4,660,672 | 4/1987 | Katou | 180/175 |
| 4,698,762 | 10/1987 | Moriya et al. | 180/179 |
| 4,709,595 | 12/1987 | Hayama | 180/177 X |

FOREIGN PATENT DOCUMENTS

| 142046 | 5/1985 | European Pat. Off. | 180/176 |
| 0050033 | 3/1985 | Japan | 180/170 |
| 0235223 | 10/1986 | Japan | 180/177 |
| 0235225 | 10/1986 | Japan | 180/177 |
| 0238514 | 10/1986 | Japan | 180/177 |

Primary Examiner—Gary Chin
Attorney, Agent, or Firm—Wenderoth, Lind & Ponack

[57] ABSTRACT

An automotive constant speed cruise control system for a vehicle comprises a controller for automatic speed change for changing over automatically speed stage in a transmission by a relation between a throttle valve opening degree and a car speed, a controller for constant speed traveling having a constant speed traveling control function for cruising a car at a target car speed by controlling based on a duty ratio the throttle valve opening degree according to a traveling car speed and a transmission limiting function for sending out a signal for prohibiting selection of maximum speed stage in the transmission to the controller for automatic speed change for a specified time when the car speed lowers, and the transmission limiting function capable of being started from outside by inputting a speed change signal representing that the transmission is shifted down from a maximum speed to the controller for constant speed traveling.

2 Claims, 13 Drawing Sheets 10, 2024

AUTOMOTIVE CONSTANT SPEED CRUISE CONTROL SYSTEM

This application is a continuation of now abandoned Ser. No. 06/948,135 filed on Dec. 29, 1989.

BACKGROUND OF THE INVENTION

1. Field of the Invention

The present invention relates to a constant speed cruise control system for a vehicle with an automatic transmission (A/T).

2. Description of the Prior Art

A constant speed cruise control system of a duty ratio control type calculates the output duty ratio D by the formula $$D = G \times \Delta V + SD \quad (1)$$

where
 G: gain
 $\Delta V$: car speed deviation
 SD: set duty ratio and adjusts the throttle valve opening degree accordingly. The car speed deviation $\Delta V$ is a difference between the target car speed VM and traveling car speed $V_n$ (or spark advance car speed VS), and the set duty ratio SD corresponds to the target car speed VM.

The purpose of the constant speed control is to render the car speed deviation $\Delta V$ equal to zero while adjusting the output duty ratio D, but when the set duty ratio SD is fixed, it is hard to establish $\Delta V = 0$. Accordingly, a method of achieving $\Delta V = 0$ by integrating and correcting the value of this SD has been proposed. In this integrating correction method, the set duty ratio SD changes, following up the output duty ratio D.

Incidentally, in the recent automatic transmission (A/T) cars, a four speed A/T with an overdrive function, (O/D) (first speed, second speed, third speed, and fourth speed=O/D) is in the main stream, and at car speeds of about 50 km/h or higher, the vehicle usually runs in O/D. But in the case of cruise control, traveling in the O/D state, constant speed traveling with, O/D is difficult when climbing a steep slope, and the car speed is lowered by the lack of power needed for driving. In addition, when the carrying capacity of the car is increased, it is the same as the abovementioned case. To avoid this, therefore, an O/D cut-off signal is delivered from an ECU (Electronic Control Unit) for a cruise controller for an automatic speed change to cut off the O/D, and by raising the driving force, the reduction of the car speed is decreased.

For example, as shown in FIG. 1 (A), when the car speed is lowered by A (e.g. 4 km/h) from the target car speed VM, the O/D cut-off signal is turned on. This O/D cut-off signal is sent into a controller for an automatic speed change, and the selection of the speed change stage is defined. That is, the judgement of this controller for an automatic speed change involves a function of prohibiting the selection of O/D even if the speed in its range and causes a shifting down to the third speed. This function is not required when the car speed recovers up to VM-B (e.g. B=2 km/h), but the O/D cut-off signal is not turned off until the O/D reset timer expires ($T_{OD}$, e.g. 14 sec). This is to prevent the frequent O/D cut-off and reset when the car speed has recovered quickly.

Meanwhile, the controller for an automatic speed change at the transmission side possesses a specific speed change pattern, and the gear is determined by the relationship between throttle opening degree and car speed. FIG. 2 is a speed change pattern between the third speed and fourth speed (O/D), in which the broken line indicates a region line rising shift-down and the solid line denotes a region line rising shift-up. When the control system is independent as shown here, if the ECU (electronic control Unit) for cruise control continues to open the throttle valve due to a speed reduction when climbing up a slope, the O/D may be cut off at the transmission side before the car speed is lowered to the O/D cut-off car speed (VM-A). Such a case is shown by VM-C in FIG. 1 (B). When the car speed rises as a result, the ECU for cruise control closes the throttle valve, and the transmission returns to O/D according to the speed change pattern. At this time, the car is in a state in which its driving power is deficient, and thus the car speed is lowered. As a result, the throttle valve is opened by a control signal output from the ECU for cruise control and the O/D is cut off at the transmission side. Hereinafter such an operation is repeated, and an O/D cut-off and reset are repeated in short time periods (that is, O/D hunting occurs).

Furthermore, if third-speed traveling results due to such an O/D cut-off, since the throttle valve opening degree is large due to the car speed being lowered at the O/D cutting-off, the driving force may be excessive unless the throttle valve opening degree at the O/D cutting-off is quickly returned, and it may lead to a car speed overshoot as shown in FIG. 3. The same holds true when shifting down to the third-speed independently at the side of the controller for an automatic speed change in the relationship between throttle valve opening degree and car speed (speed change pattern).

SUMMARY OF THE INVENTION

To solve the aforementioned problems, it is an object of the present invention to prove a novel and improved automotive constant speed cruise control system.

It is another object of this invention to prevent O/D hunting in short time periods by detecting the O/D cut-off caused by the control system on the transmission side by means of the cruise control system on cruise control side and by commonly using the cruise control system O/D reset timer for both control systems.

To accomplish the above objects, an automotive constant speed cruise control system for a vehicle in accordance with the present invention comprises a controller for automatic speed change for automatically changing over a speed stage in a transmission by a relationship between a throttle valve opening degree and a car speed, a controller for constant speed traveling having; a constant speed traveling control function for causing a car to cruise at a target car speed by controlling the throttle valve opening degree according to a travelling car speed, said degree being controlled by controlling the value duty ratio, and a transmission limiting function for sending out a signal for prohibiting the selection of a maximum speed stage in the transmission to the controller for automatic speed change for a specified time when the car speed lowers, and the transmission limiting function capable of being started from outside by inputting a speed change signal representing that the transmission is shifted down from a maximum speed to the controller for constant speed traveling.

In a preferred embodiment, the speed change signal input to the controller for constant speed traveling is canceled in the controller for constant speed traveling when the output duty ratio controlling the throttle valve opening degree is smaller than a set duty ratio corresponding to the target car speed.

According to the present invention, the transmission limiting function (O/D cut-off) of the controller for constant speed traveling, that is, the ECU for cruise control, which is an internal mechanism, also be started from the outside. For instance, making use of the speed change signal from the controller for automatic speed change or the speed change detection signal by a hydraulic switch, the transmission limiting function of the controller for constant speed traveling is started when the transmission shifts down from the maximum speed (O/D) in its own speed change pattern. That is, sending out an O/D cut-off signal, the O/D reset timer is used when returning. In this manner, since hunting in FIG. 1 (B) is extended to the period, the repeating frequency of O/D cut-off and reset is lowered. FIG. 6 shows the operation waveform diagram of this case.

However, when the O/D is shifted down to the third speed at the transmission side as a result of a driver's stepping on the accelerator pedal, its reset must be prompt. In this case, too, the aforementioned function of O/D cut-off hold should not be put in effect, and the O/D cut-off hold is prevented by a detection from the relationship between the duty ratio D for constant speed control and the set duty ratio SD (D<SD). This case is shown in the operation waveform diagram in FIG. 7.

According to this invention, it is advantageous that the O/D hunting in short time periods of an A/T car when climbing a slope can be prevented by the function at the constant speed traveling controller side, so that the controller for automatic speed change does not need to be modified. When overriding, moreover, the quick response of shifting by controlling at the automatic transmission side may remain.

It is a further object of this invention to prevent O/D hunting in short time periods by detecting the O/D cut-off caused by the control system on the transmission side by means of the control system on the cruise control side and by commonly using the cruise control system O/D reset timer for both control systems, so as to also thereby prevent O/D hunting during long time periods during the time span of said timer. That is, when a gradient of an upslope is steep and its distance is long, since the O/D cut-off state is held after resetting the O/D by the O/D reset timer again, the O/D hunting during long periods during time span of the timer remains, but this O/D hunting is also prevented by this invention.

To accomplish the above object, an automotive constant speed cruise control system for a vehicle in accordance with the present invention comprises a controller for automatic speed change for automatically changing over a speed stage in a transmission by a relationship between a throttle valve opening degree and a car speed, a controller for constant speed traveling having; a constant speed traveling control function for causing a car to cruise at a target car speed by controlling the throttle valve opening degree according to a traveling car speed, said degree being controlled by controlling the value duty ratio, a transmission limiting function for sending out a signal for prohibiting selection of a maximum speed stage in the transmission to the controller for automatic speed change when the car speed lowers, and a function for releasing the signal for prohibiting selection when an engine load becomes small.

In another preferred embodiment, the controller for constant speed traveling includes a function of releasing the signal for prohibiting selection of a maximum speed stage in the transmission when a small engine load condition continues for at least a specified time.

In still another preferred embodiment, the transmission limiting function is started from outside by inputting a speed change signal representing that the transmission is shifted down from a maximum speed stage to the controller for constant speed traveling.

In yet another preferred embodiment, the engine load is detected from an intake manifold negative pressure.

Besides, in a preferred embodiment, the engine load is detected from an average value of an output duty ratio.

Moreover, in another preferred embodiment, it is determined the engine load is smaller than or equal to a specified value by the following inequality:

$$DM < SDF + C + \alpha \qquad (2)$$

where
DM: average value of output duty ratio D
SDF: value of DM when a specified time is expired after setting the target car speed
C: offset value
$\alpha$: offset correction term.

Furthermore, in still another preferred embodiment, the value of the offset correction term $\alpha$ is slowly changed to reduce the difference between DM and $\alpha$ while the signal for prohibiting selection is being output.

In addition, in another preferred embodiment, the output duty ratio D is calculated by $$D = G \times \Delta V + SD \qquad (1)$$

where
G = gain
$\Delta V$ = car speed deviation
SD = set duty ratio;
the car speed deviation $\Delta V$ is converged by adjusting the throttle valve opening degree by use of the output duty ratio D, the output duty ratio mean SDF of the duty ratio mean DM of the output duty ratio D is used for controlling the transmission when a specified time expires after setting the target car speed VM, and possible values of the output duty ratio mean SDF are limited in a constant range based on the initial value $SD_0$ of the set duty ratio corresponding to the car speed.

According to the present invention, the transmission limiting function (O/D cut-off) of the controller for constant speed traveling (i.e.—the ECU for cruise control), which is an internal mechanism, can also be started from the outside. For instance, making use of the speed change signal from the controller for automatic speed change or the speed change detection signal by a hydraulic switch, the transmission limiting function of the controller for constant speed traveling is started when the transmission shifts down from the maximum speed (O/D) in its own speed change pattern. That is, after sending out an, O/D cut-off signal, the O/D reset timer is used when returning to the O/D state. As a result, hunting during short time periods as shown in FIG. 1 (B) is eliminated.

If, however, the upslope is great and long, the O/D is cut off again after O/D reset as shown in FIG. 1 (A), and O/D hunting for a long time period (10 to 30 sec) of $(T_{OD}+T\alpha)$ remains ($T\alpha$ varies with the slope). Hence, in this invention, the O/D state is not returned to until the slope becomes less than a specified value (for example, 3%). This purpose may be achieved by using a slope sensor, but this invention alternatively proposes methods using the measurement of an engine load.

According to this method, it can be referred not only to an upslope gradient but also to a carrying capacity of a car. One of the performable methods is the method of detecting the load (or the gradient) from the average value DM of the duty ratio D, and the other method is to detect the load (or the gradient) from the value of intake manifold negative pressure. The former is realized by the software of the ECU for cruise control, while the latter may be realized by using an existing vacuum switch. At least one of these two methods is used together with car speed detection. The vacuum switch has a hysteresis width (b-a) between the ON negative pressure a and OFF negative pressure b as shown in FIG. 9. The negative pressure is an intake manifold negative pressure, and as the slope increases, the negative pressure becomes smaller. Therefore, one of the O/D reset conditions is that the OFF negative pressure b is set at a desired value and that this switch is turned off.

It is hence advantageous that O/D hunting in short time periods and long time periods of an A/T car in climbing can be prevented by the function at the constant speed traveling controller side, so that the controller for automatic speed change need not be modified.

It is a further different object of this invention to decrease the car speed overshoot by suddenly decreasing the set duty ratio SD.

To accomplish the above objects, an automotive constant speed cruise control system for a vehicle in accordance with the present invention comprises calculating an output duty ratio D by $$D = G \times \Delta V + SD \quad (1)$$

where
G = gain
$\Delta V$ = car speed deviation
SD = set duty ratio;

converging the car speed deviation $\Delta V$ by adjusting the throttle valve opening degree by use of the output duty ratio D, correcting to integrate the set duty ratio SD corresponding to the target car speed, and lowering the set duty ratio SD when shifting down from a maximum speed stage on the transmission side.

In a preferred embodiment, when shifting down from the maximum speed stage at the transmission side, the set duty ratio SD is lowered to the SFD of the duty ratio mean DM of the output duty ratio D when a specified time expires after setting the target car speed VM.

In a preferred embodiment, the set duty ratio SD is lowered to SDF+C (C: offset value), when shifting down from a maximum speed stage in the transmission.

In another preferred embodiment, possible values of the output duty ratio mean SDF are limited in a constant range based on the initial value $SD_o$ of the set duty ratio corresponding to the car speed.

In addition, when shifting down to increase the driving force while the car speed slows down, the duty ratio D is suddenly lowered, in other words, the car speed overshoots due to an excess of driving power unless the throttle is returned when shifting down. However, according to this invention, in the methods of integrating, and correcting the set duty ratio SD, the SD also rises when the car speed slows down, thereby preventing a sudden decrease of duty ratio D. Accordingly, aside from the integrating correction, the set duty ratio SD is quickly lowered to a desired value, and the duty ratio D is suddenly decreased from the value in equation (1). Hence, car speed overshoot may be prevented. FIG. 17 explains this operation.

Thus, according to this invention, in constant speed cruise control of an A/T car, since the increase of driving force accompanied by an O/D cut-off (shift-down from the maximum speed) is absorbed by the quick decrease of the duty ratio, the car speed overshoot right after O/D cut-off can be prevented.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1A:
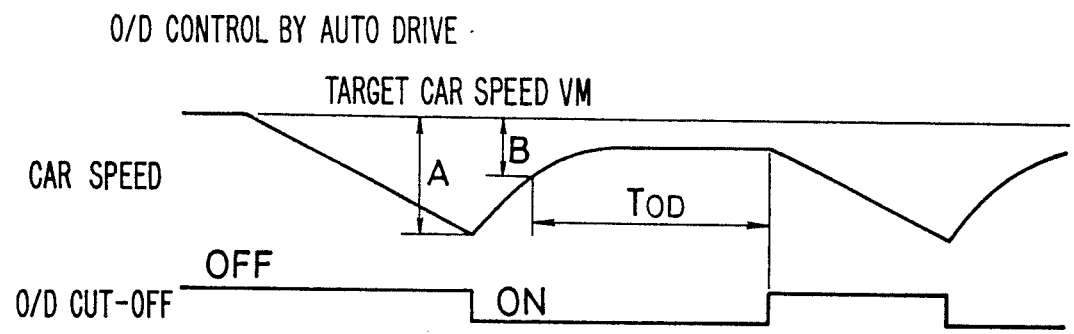
FIGS. 1(A) and (B) are conventional operation waveform diagrams.

Referring now to the drawings, preferred embodiments of the invention are described below.

Figure 4:
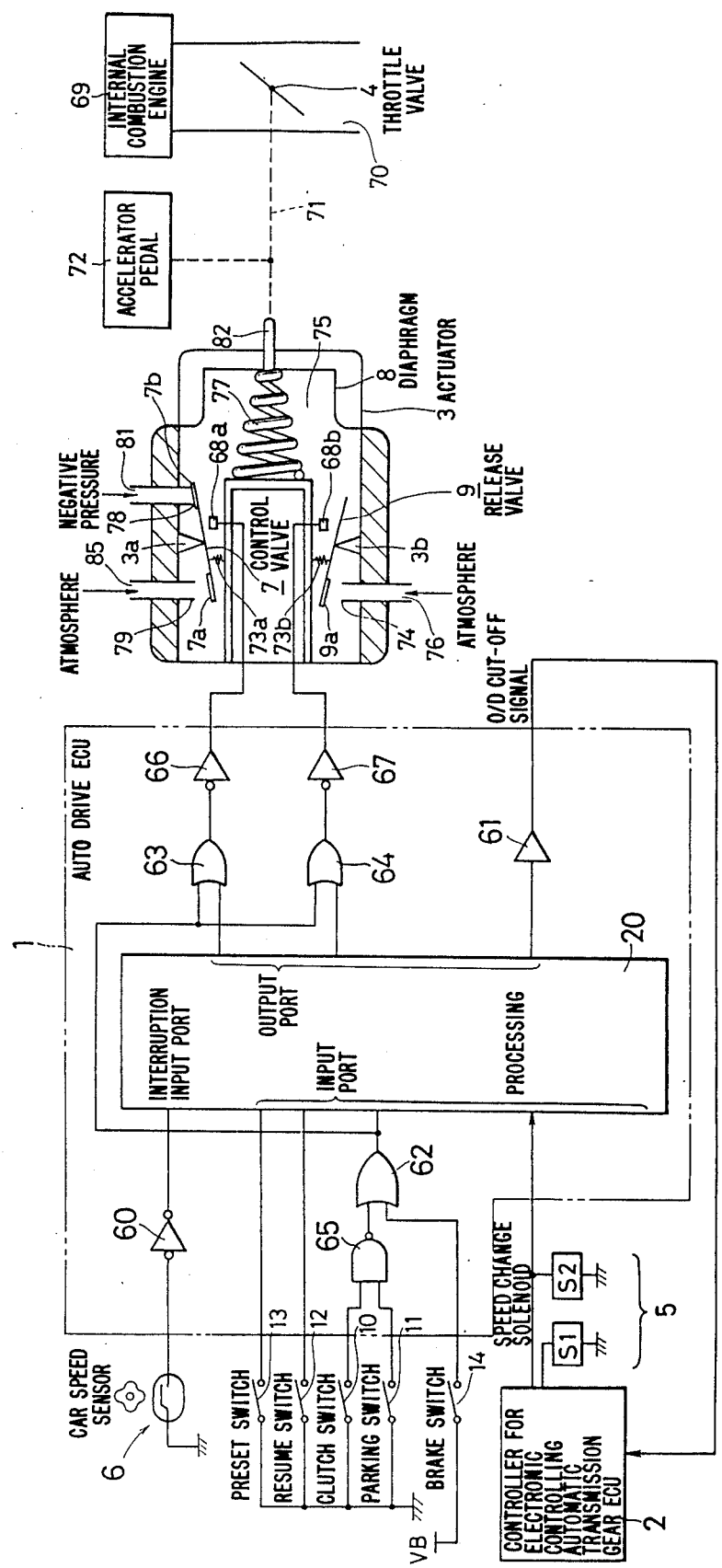
FIG. 4 is a system block diagram showing one of the embodiments of this invention.

FIG. 4 is a system block diagram showing one of the embodiments of this invention, in which numeral 1 denotes an Auto Drive ECU (controller for constant speed traveling), and 2 is a controller for electronically controlling an automatic speed change stage (ECU for automatic speed change). The ECU 1 for cruise control adjusts the opening degree of a throttle valve 4 by controlling an actuator 3 by the duty ratio. By contrast, the ECU for automatic speed change 2 changes over the speed gears by controlling speed change solenoids S1, S2 of a transmission 5 (whose main body is not shown).

The ECU 1 possesses a processing circuit 20 which is realized by buffers 60, 61, OR gates 62, 63, 64, NAND gate 65, inverting circuits 66, 67, and microcomputer. A car speed sensor 6 which detects the car speed has a reed switch which is turned on and off by the magnet rotating in proportion to the rotation of the vehicle drive shaft. The car speed signal from the car speed sensor 6 is applied to an interruption input port of the processing circuit 20 by way of the buffer 60. The output of a preset switch 13 is fed to the input port of the processing circuit 20. The output of a resume switch 12 is applied to the input port of the processing circuit 20. The output of a clutch switch 10 is sent into one of the input terminals of NAND gate 65, and the output of a parking switch 11 is applied to the other input terminal of the NAND gate 65. The output of NAND gate 65 is applied to one of the input terminals of OR gate 62, and the output of a brake switch 14 is fed to the other input terminal of the OR gate 62. The output of the OR gate 62 is fed to the input port of the processing circuit 20, and is also applied to one of the input terminals of the OR gates 63, 64. The other input terminals of the OR gates 63, 64 are individually connected to the output port of the processing circuit 20. The output from the OR gate 63 is fed to a coil 68a for the control valve of the actuator 3. The output from the OR gate 64 is fed to a coil 68b for the release valve of the actuator 3 through an inverting circuit 67. An O/D cut-off signal is delivered from the output port of the processing circuit 20, and is fed to the ECU2 by way of the buffer 61.

The throttle valve 4 is provided in an air intake route 70 of a spark ignition internal combustion engine 69 used as a driving source of an automobile. This throttle valve 4 is driven by the actuator 3 for automatic control through a link mechanism 71, and is also operated by an accelerator pedal 72.

A release valve 9 provided in the actuator 3 is opened and closed by a releasing coil 68b which is driven by the output of an inverting circuit 67. When the coil 68a of the release valve is being demagnetized, a valve body 9a of the release valve 9 is displaced, being moved away from a valve seat 74 by the force of a spring 73b, around a fulcrum 3b. Therefore, a diaphragm chamber 75 of the actuator 3 is opened to the atmosphere through a valve hole 76, so that the diaphragm 8 remains thrusted by a spring 77. When the coil 68b of the release valve energized by the output from the inverting circuit 67, the valve body 9a of the release valve 9 is angularly displaced around the fulcrum 3b, resisting the spring force of the spring 73b, and is seated on the valve seat 74. Therefore, the valve hole 76 is isolated from the diaphragm chamber 75. During constant speed cruise control, the state of the valve hole 76 being isolated from the diaphragm 75 is maintained.

The ECU 1 detects the traveling car speed by the signal from the car speed sensor 6. The ECU 1 also stored the traveling car speed when the preset switch 13 is turned on, and the duty ratio of the control valve 7 of the actuator 3 is controlled after the preset switch 13 is turned off. That is, while the car continues to travel by controlling for a constant speed cruise, the opening degree of the throttle valve 4 is controlled by the function of the control valve 7.

While the coil 68a of the control valve is not excited, the valve body 7a of the control valve 7 is spaced from the valve seat 79 by the spring force of the spring 73a, and the diaphragm chamber 75 is opened to the atmosphere by way of a valve hole 85. This control valve 7 is free to displace angularly around the fulcrum 3a. While the valve body 7a is spaced from the valve seat 79, another valve body 7b is seated on the valve seat 78, the valve hole 81 being isolated the diaphragm chamber 75. The valve hole 81 communicates with the upstream side from the throttle valve 4 in the air intake route 70 lowered in pressure.

By the output from the inverting circuit 66, the coil 68a of the control valve is energized, and the coil 68a for the control valve is excited, so that the control valve 7 is displaced angularly resisting the spring force of the spring 73a, causing the valve body 7b to be spaced from the valve seat 78, and the diaphragm chamber 75 is joined with the air intake route 81, thereby rendering the diaphragm chamber 75 be lowered in pressure. As the diaphragm chamber 75 reaches a lowered pressure, the diaphragm 8 overcomes the spring force of the spring 77, and is displaced rightward in FIG. 4. Corresponding to this, a rod 82 is displaced rightward, so that the throttle valve 4 is controlled to be wider in the opening degree by the link mechanism 71. When a cancel signal (clutch switch 10, or in an A/T car, neutral start switch, parking switch 11 or brake switch 14) is input, both the control valve 7 and release valve 9 are turned off, and the atmosphere is led in from both sides to stop the control swiftly. When the resume switch 12 is turned on after the canceling due to the input of the cancel signal, the traveling speed control is recovered by the previous storing of the car speed.

Figure 5:
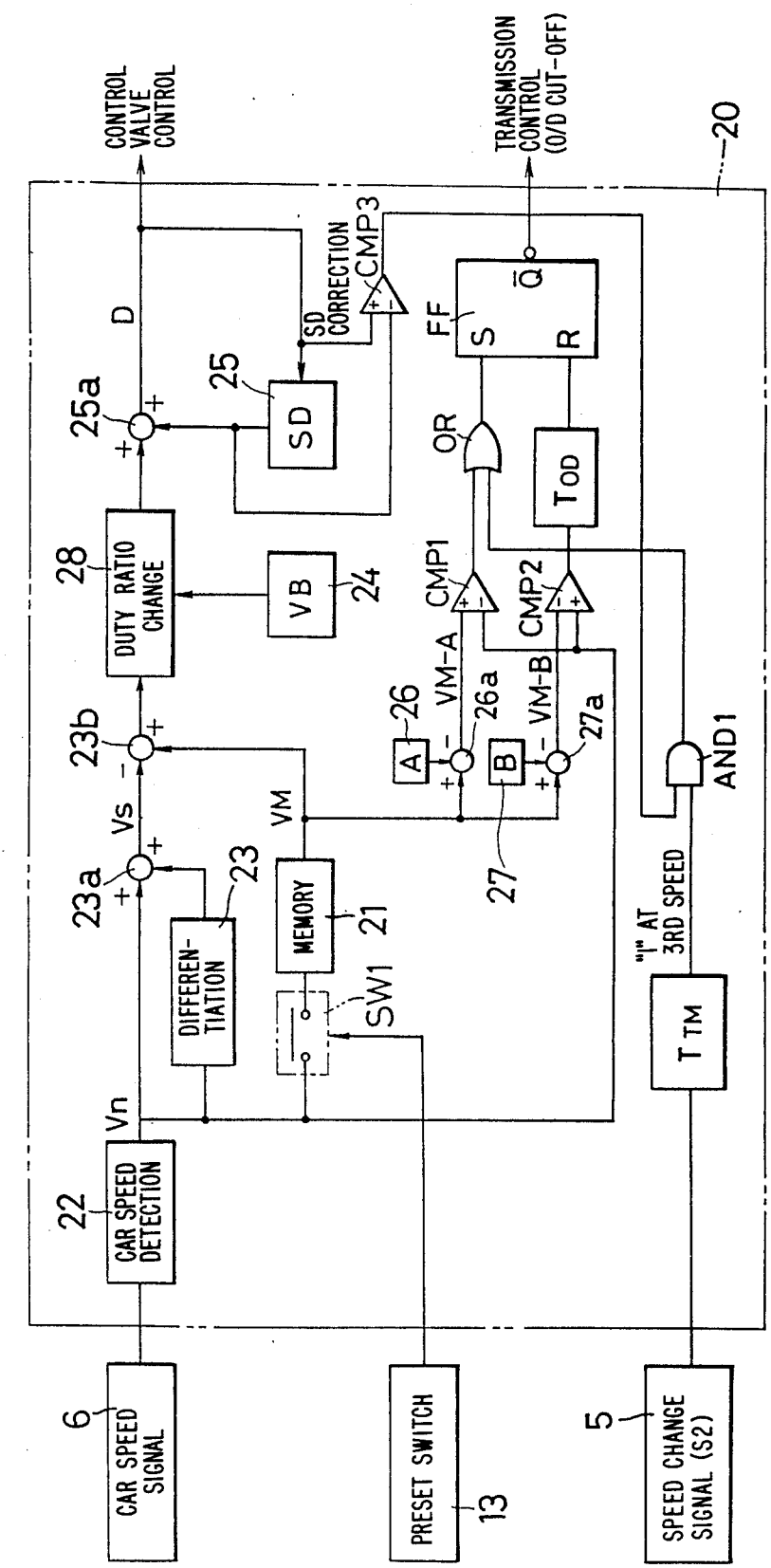
FIG. 5 is a block diagram showing the processing constitution of a control circuit 20.

A control circuit 20 is used in the ECU 1, and its processing is shown in a block diagram in FIG. 5. The output duty ratio D for on/off control of the control valve 7 is determined according to the difference between the target car speed VM stored in a memory circuit 21 and the traveling car speed Vn, but more specifically it is not exactly the traveling car speed Vn detected in a car speed detecting part 22, but is a skip car speed VS, which is a sum of traveling car speed Vn and a car speed change component (differential component) having the traveling car speed Vn differentiated in a differentiating circuit 23, being added up in a summation circuit 23a. On the other hand, the target car speed VM is stored in the memory 21 when the switch SW1 is turned on by operating the present switch 13. This is to compensate for action delay of the actuator 3 shown in FIG. 4 and loss time due to hysteresis or play in the throttle valve 4 or drive system. Therefore, the skip car speed VS is determined in the following equation (3).

$$VS = Vn + K \times (Vn - V_{n-1}) \tag{3}$$

where
  Vn: present car speed
  $V_{n-1}$: previous car speed
  K: proportion constant
The skip car speed VS and target car speed VM are fed into a subtraction circuit 23b to determine the difference therebetween, and a car speed deviation ΔV (=VM−VS) is determined. This car speed deviation ΔV is applied to a duty ratio changing circuit 28.

The duty ratio changing circuit 28 operates a duty G×ΔV by applying the car speed deviation ΔV and the gain G which is an inverse number of the control car speed width VB from a gain setting circuit 24 into the duty ratio changing circuit 28.

The output G×ΔV from this duty ratio changing circuit 28 and the set duty ratio SD corresponding to the target car speed VM from the set duty ratio setting circuit 25 are summed in the summation circuit 25a, and the output duty ratio D is determined.

That is, the output duty ratio D is determined in the following equation (1).

$$D = G \times \Delta V + SD \qquad (1)$$

where
G: gain
SD: set duty ratio corresponding to target car speed VM
ΔV: car speed deviation (=VM−VS)

Generally, constant speed cruising is done at a car seed within a O/D range. However, since in the traveling within O/D range for climbing a slope and the constant speed traveling is difficult because of the lack of driving power, an O/D cut-off signal is issued by the ECU 1 to cause the ECU 2 to select the third speed. The speed change control logic by this ECU 2 is as shown below.

TABLE 1

| Solenoid | Shift | | | |
|---|---|---|---|---|
| | 1st speed | 2nd speed | 3rd speed | O/D |
| S1 | ON | ON | OFF | OFF |
| S2 | OFF | ON | ON | OFF |

Therefore, the ECU 1, when monitoring the solenoid S2, can detect shift-down from the O/D to the third speed (or second speed) of the transmission 5 by its change from OFF to ON. At this time, if it is not necessary to cut off the O/D from the viewpoint of constant speed cruising control, the ECU 1 turns on the O/D cut-off signal to prevent O/D hunting during short periods mentioned above.

This operation is further described in FIG. 5. The target car speed VM stored in the memory circuit 21 and the value A set in the constant setting circuit 26 are fed into the subtraction circuit 26a so as to determine the difference therebetween, and the difference VM-A is applied to the non-inverting input terminal of comparator CMP1. At the inverting input terminal of comparator CMP1, the car speed Vn is given. Similarly, the target car speed VM and the value B set in the constant setting circuit 27 are fed into the subtraction circuit 27a to be subtracted, and the difference VM-B is applied to the inverting input terminal of comparator CMP2. The car speed Vn is fed to the non-inverting input terminal of comparator CMP2. The comparator CMP1 renders the output to 1 and sets the flip-flop FF when the car speed Vn drops below (VM-A). The comparator CMP2 renders the output to 1 when the car speed Vn recovers to over (VM-B). This output is counted by the O/D reset timer $T_{OD}$, and when it continues, for example, for 14 seconds, the flip-flop FF is reset. This is an O/D cut-off hold function at the constant speed traveling device side, and it corresponds to the action shown in FIG. 1 (A). As a result, the Q output of the flip-flop FF becomes an O/D cut-off signal, and is fed into the ECU 2 in FIG. 4.

In this invention, a labelled OR in FIG. 5, gate OR is provided so as to set this flip-flop FF from outside, and, for example, a speed change signal (S2) is introduced into it from the ECU 2. At this time, however, in order to judge when it is better not to control, such as the case of speed change by override, this control is effected only when all the following conditions are established.

[1] When a speed change signal to the third speed continues for a specified time (e.g. 1 sec).

[2] When the relationship of output duty ratio D (or the value averaged by filter processing) and the set duty ratio SD is D>SD.

Condition [1] is detected by the timer $T_{TM}$, and condition [2] is detected by comparator CMP3.

Figure 6:
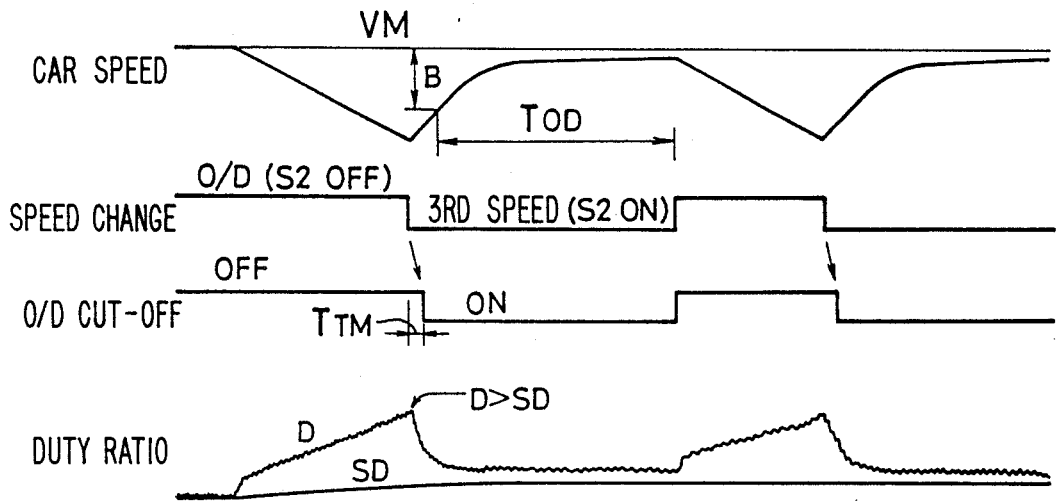
FIG. 6 is an operation waveform diagram showing an O/D cut-off hold state by speed change detection.

FIG. 6 explains this operation, in which the speed is shifted down from O/D to the third speed by the ECU2 before the car speed is lowered to (VM-A).

In climbing a slope, as the car speed is lowered by the lack of diving power, the cruise control side increases the output duty ratio and the throttle vale opening degree is increased. As a result, when the speed change stage is shifted down from O/D to third stage by the control signal of the ECU 2 corresponding to the relationship between the car speed and the throttle valve opening degree, since it becomes D>SD, after the expiration of timer $T_{TM}$, the output of AND gate AND in FIG. 5 becomes 1, and the flip-flop FF is set. When this FF is set, its reset, that is, return to O/D, depends on the Auto Drive side. As a result, hunting as in FIG. 1 (B) may be prevented.

Figure 7:
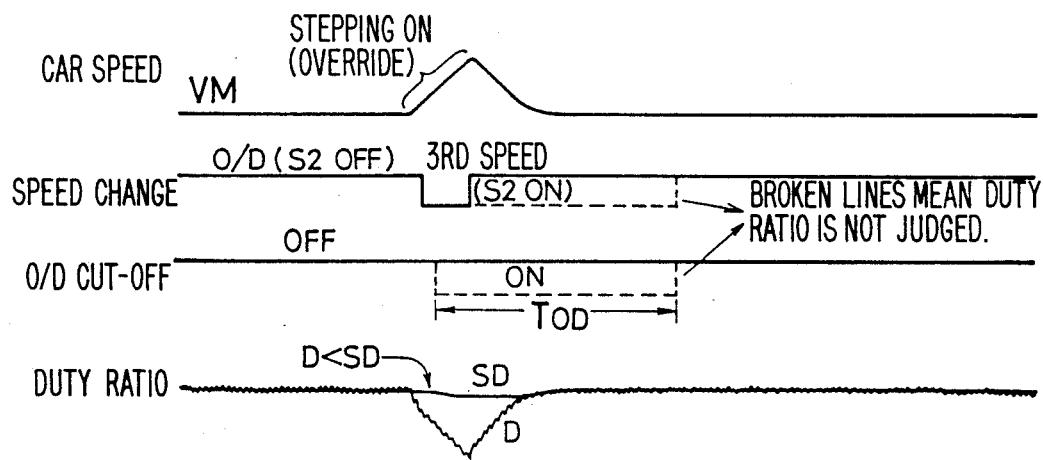
FIG. 7 is an operation waveform diagram to explain the cut hold prevention in an override state.

By contrast, when the accelerator pedal 72 is stepped down in constant speed cruising, the speed is temporarily shifted down from O/D to the third speed. At this time, however, since the car speed increases as shown in FIG. 7, the duty ratio D decreases, resulting in D<SD. Accordingly, the flip-flop FF is not set, and the third speed may be returned to the O/D only by the conditions at the transmission side.

Meanwhile, it is also possible to integrate and correct the set duty ratio SD by using duty ratio mean DM and basic set duty ratio SD1. For example, it is a method for correcting for integrating the set duty ratio SD as shown in equations (4), (5), and (6).

$$SD = SD1 + (DM - SD1)n \qquad (4)$$

$$DM = Dm - (D - DM)/K \qquad (5)$$

$$SD1 = SD1 + \beta \qquad (6)$$

where
SD1: basic set duty ratio
DM: duty ratio mean
n: constant
K: constant (in responding with car speed)
β: D>SD1 β=positive constant
D<SD1 β=negative constant or
β=(D−SD1)×H (constant)

In this case, condition (2) can be judged by using SD1 instead of SD.

Figure 8:
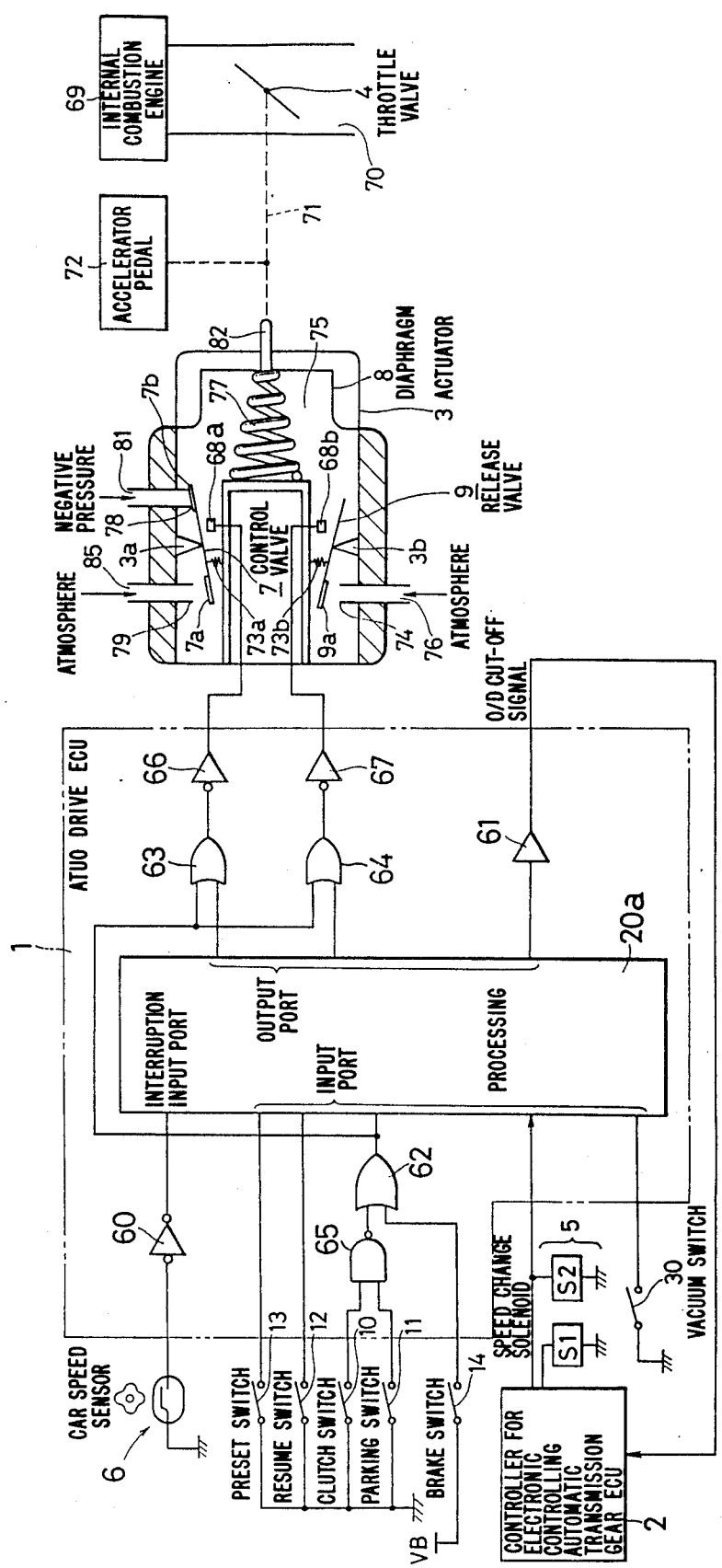
FIG. 8 is a system block diagram showing another embodiment of this invention.

FIG. 8 is a system block diagram showing another embodiment of this invention. In this embodiment, the parts similar to or corresponding to those used in the preceding embodiments are given identical reference numbers. This embodiment, as the same way with the embodiment abovementioned, delivers an O/D cut-off signal when the speed is shifted down from the maximum speed (O/D) by the transmission in its own speed change pattern, and uses an O/D reset timer when returning. In this way, the short-period hunting in FIG. 1 (B) is eliminated.

Figure 1B:
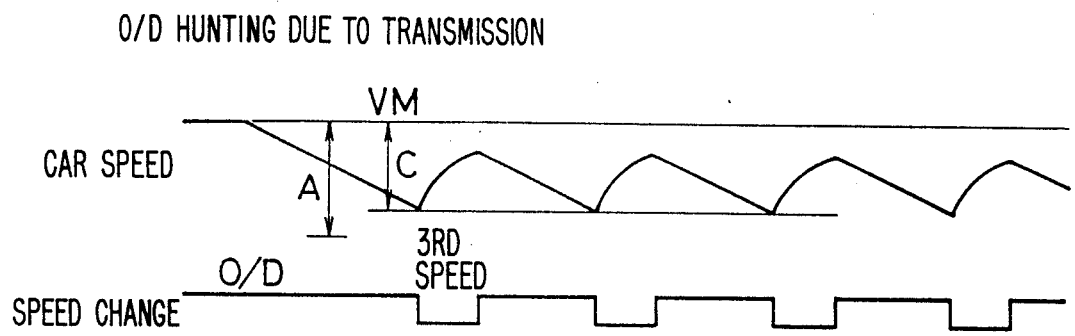
Figure 2:
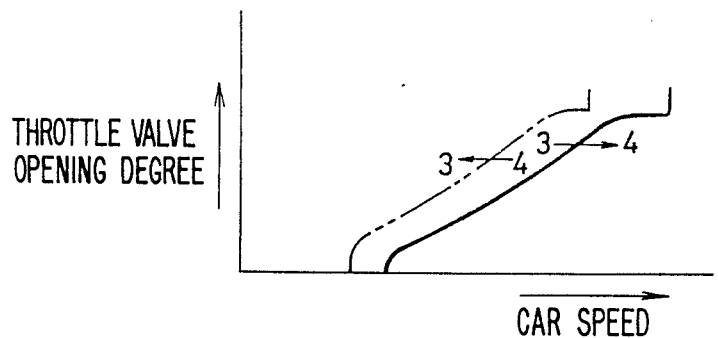
FIG. 2 is an explanatory view of the speed change pattern of a conventional automatic transmission.
Figure 3:
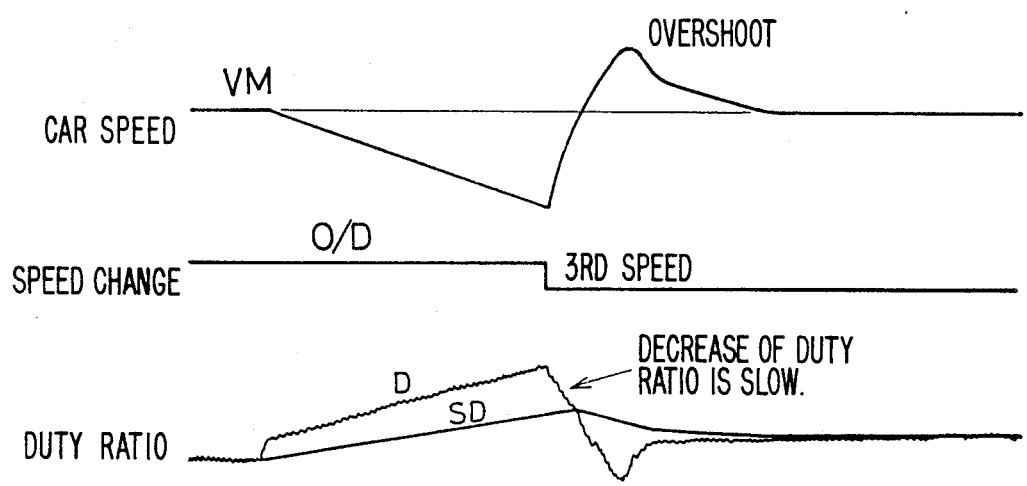
FIG. 3 is a conventional operation waveform diagram.
Figure 9:
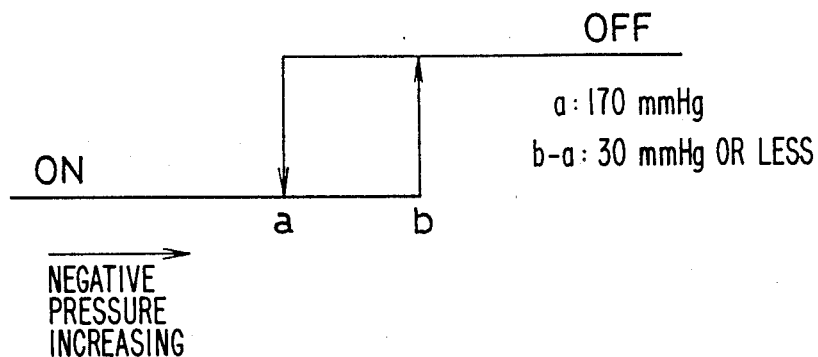
FIG. 9 is a characteristic diagram of a vacuum switch 30.

However, when the climbing slope or the engine load is great, as shown in FIG. 1 (A), the O/D is cut off again after O/D reset, and O/D hunting of a long period (10 to 30 sec) of ($T_{OD}+T\alpha$) remains ($T\alpha$ varies with the slope). Accordingly, in this embodiment, the O/D is not restored until the slope or the engine load becomes less than a specified value (for example, 3%). For this purpose, a vacuum switch 30 is provided, and by this vacuum switch 30, the slope (or the load) is detected from the magnitude of the intake manifold negative pressure. The vacuum switch 30 is a switch for operating the vacuum pump so that the diaphragm 8 is operated when the magnitude of the intake manifold negative pressure is also small. This vacuum switch 30 has a hysteresis width (b-a) between the lower pressure in an ON state a and the lower pressure in the OFF state b as shown in FIG. 9. The lower pressure is an intake manifold negative pressure, and as the slope becomes steeper, the lower pressure becomes, smaller. Therefore, it is one of the conditions of O/D reset, as described below, that the lower pressure in the OFF state b is set at a desired value and that this switch is turned off. Incidentally, the lower pressure in the ON state a is, for example, 170 mmHg, and the hysteresis width (b-a) is, for example, 30 mmHg or less.

Figure 10:
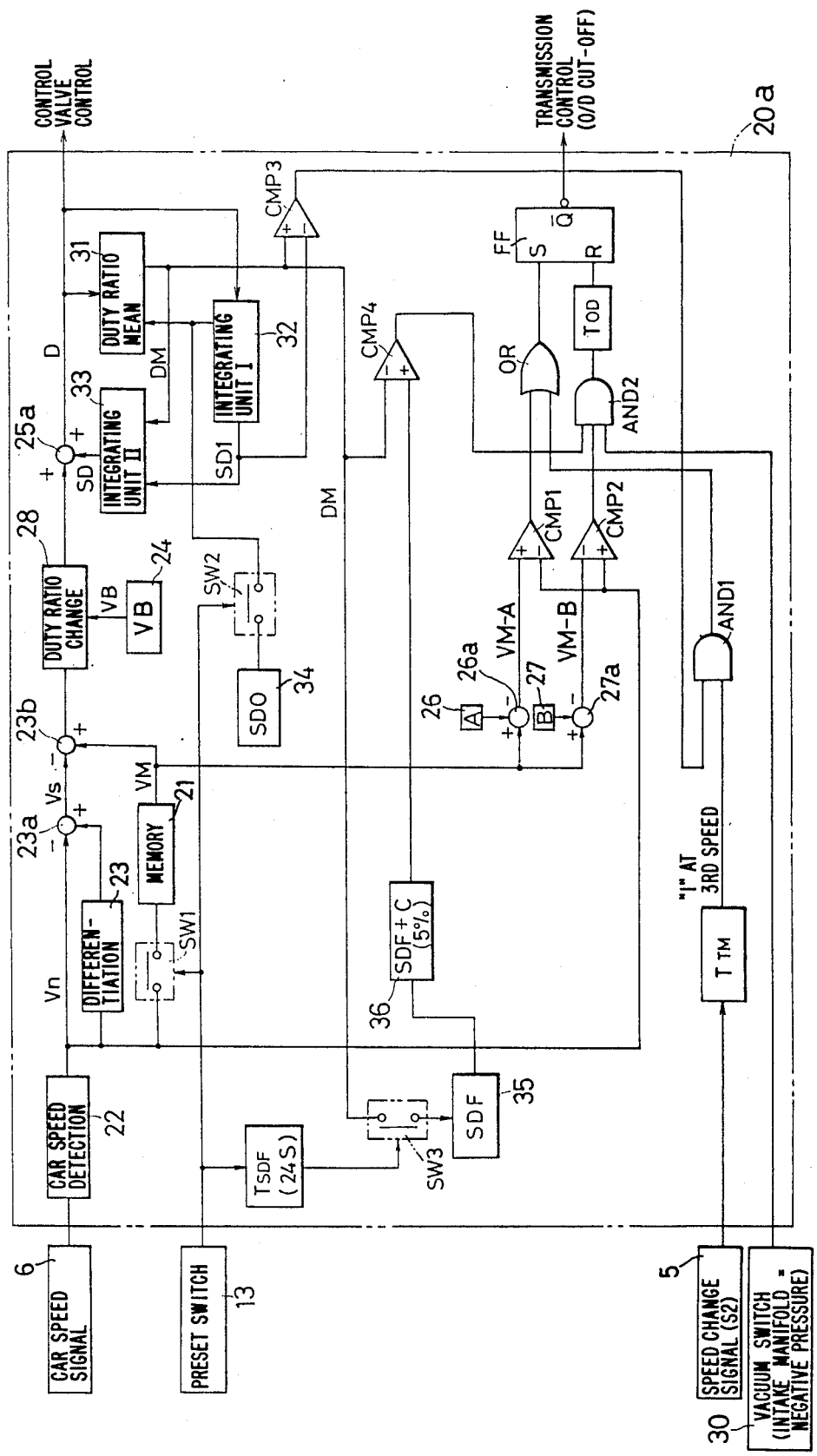
FIG. 10 is a block diagram showing the processing constitution of a control circuit 20a in a further different embodiment.

FIG. 10 is a block diagram showing the processing constituting of a control circuit 20a used in the embodiment shown in FIG. 8. This control circuit 20a is similar to the control circuit 20 in the preceding embodiment, and identical components are given the same reference numbers.

This embodiment comprises a duty ratio mean calculating circuit 31 for calculating the mean of output duty ratio DM, an integrating unit 32 for calculating the basic set duty ratio SD by integrating and correcting the output duty ratio D, and an integrating unit 33 for calculating the set duty ratio SD by integrating and correcting, using the basic set duty ratio SD1 and duty ratio mean DM. The initial value $SD_0$ of basic set duty ratio SD1 stored in the initial value setting circuit 34 is applied to the duty ratio mean calculating circuit 31 and integrating unit 32 when the switch SW2 conducts. Also disposed are timer $T_{SDF}$ which is set by the preset switch 13, switch SW3 which is made to conduct when the timer $T_{SDF}$ is actuated, memory circuit 35 for storing the mean of output duty ratio SDF when the timer $T_{SDF}$ expires, and summation circuit 36 for adding offset value C to the value of SDF stored in the memory circuit 35. The value SDF+C from the summation circuit 36 is given to the non-inverting input terminal of comparator CMP4, and the mean DM of duty ratio D is fed to the inverting input terminal of comparator CMP4.

Between the O/D reset timer $T_{OD}$ and comparator CMP2 there is an AND gate AND2. The output of this AND gate AND2 is fed to the reset timer $T_{OD}$. In this AND gate AND2, the output of comparator CMP4, the output of comparator CMP2 and the output of vacuum switch 30 are introduced.

In this embodiment, an OR gate OR is provided so that the flip-flop FF may be set from outside, and a speed change signal (S2) from the ECU2 is led into this.

At this time, however, in order to exclude the speed change due to override or other cases, the FF is set only when the following two conditions are established, that is: [1] when a speed change signal to the third speed continues for a specified time (for example, 1 sec), and [2] when the relationship between the output duty ratio D (or the value averaged by filter processing) and the set duty ratio SD (or the basic set duty ratio SD1 mentioned below) is D>SD. Condition [1] is detected by timer $T_{TM}$, and condition [2] is detected by comparator CMP3.

In this embodiment, the resetting condition of flip-flop FF, that is, the O/D returning condition, is that all inputs of AND gate AND2 continue for the duration of O/D timer $T_{OD}$ (14 seconds as mentioned above). The first input of the AND gate AND2 is that the "1" output of comparator CMP2, that is, the car speed Vn, returns to (VM-B). The second is that the vacuum switch 30 is turned off, and the third is that the output of comparator CMP4 becomes "1". The second input indicates, as explained in FIG. 9, that the slope is decreased, for example, to 3% or less. The third input is similar, and it is obtained as a result of duty ratio treatment inside.

That is, the duty ratio D is expressed in equation (1) above, and in this embodiment, this set duty ratio SD is integrated and corrected by using duty ratio mean Dm and basic set duty ratio SD1. Namely, the set duty ratio SD is calculated in the integrating unit 33 as equation (4).

$$SD = SD1 + (DM - SD1)/n \qquad (4)$$

where
n: constant

The DM is the mean of duty ratio D, and new duty ratio mean DM is calculated by equation (5) by using the previous DM and the output duty ratio D in the duty ratio mean calculating circuit 31.

$$DM = DM - (D - DM)/K \qquad (5)$$

where
K: constant

SD1 is a basic duty ratio and is calculated by equation (6) in the integrating circuit 32.

$$SD1 - SD1 + \beta \qquad (6)$$

That is, the integrating circuit 32 compares the previous SD1 with the output duty ratio D, $\beta$ (positive constant) being added to the previous SD1 when D>SD1, and $\beta$ (negative constant) being added to the previous SD1 when D<SD1, so that a new basic set duty ratio SD1 is calculated. However, the initial values of these DM and SD1 are $SD_0$ which is determined by design, and it is set together by switch SW2 when storing the target car speed VM by switch SW1. In 24 seconds after this setting, the timer $T_{SDF}$ is actuated, and the switch SW3 is closed, and the value of DM at that time is taken into the SDF. In other words, the SDF is a value of mean duty ratio DM24 seconds after the setting. It may bee regarded as an average necessary duty ratio in that vehicle, and its sum with offset value C (SDF+C) may be assumed as a slope allowing to return to O/D. For example, if C=5%, when the mean duty ratio DM drops under SDF+5%, that is, when it is possible to keep a value close to the target car speed VM if the duty ratio D is small, the output of comparator CMP4 is set to "1." This is equivalent to that the vacuum switch 30 is turned off, and in this embodiment, for the sake of perfection, the flip-flop FF is reset after the expiration of the release timer $T_{OD}$ when all three inputs of the AND gate AND2 become "1."

In this setting, both O/D hunting of short periods shown in FIG. 1 (B) and O/D hunting of long periods shown in FIG. 1 (A) can be prevented.

Figure 11:
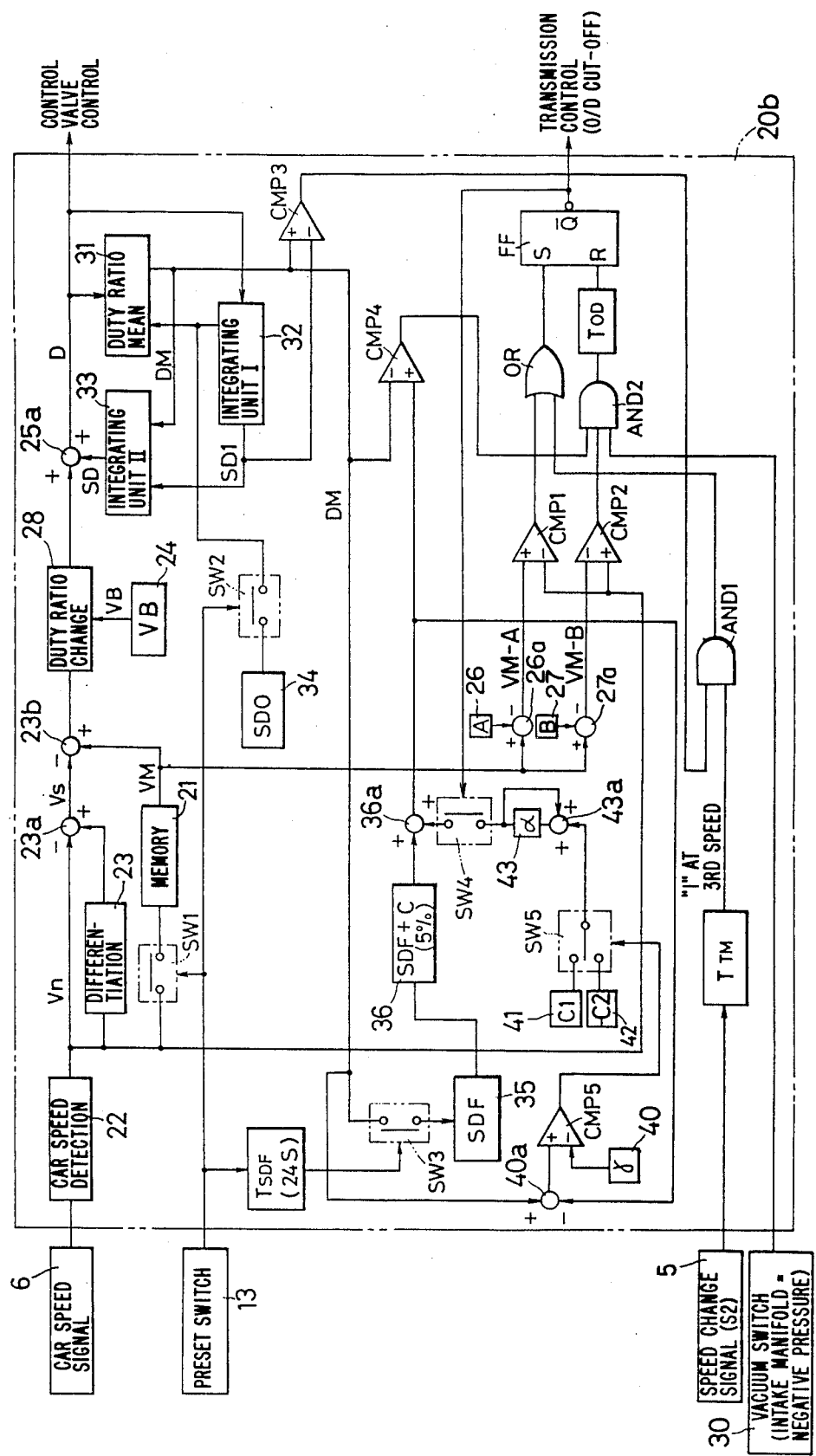
FIG. 11 is a block diagram showing the processing constitution of control circuit 20b of a further different embodiment.

FIG. 11 is a block diagram showing the processing constitution of a control circuit 20b in a further different embodiment of this invention. In this embodiment, too, the parts similar to or corresponding to those in the preceding embodiments are given the identical reference numbers. This embodiment comprises comparator CMP5, constant setting circuits 40, 41, 42, 43 for setting constants γ, C1, −C2, α, respectively, and switches SW4, SW5.

Figure 12:
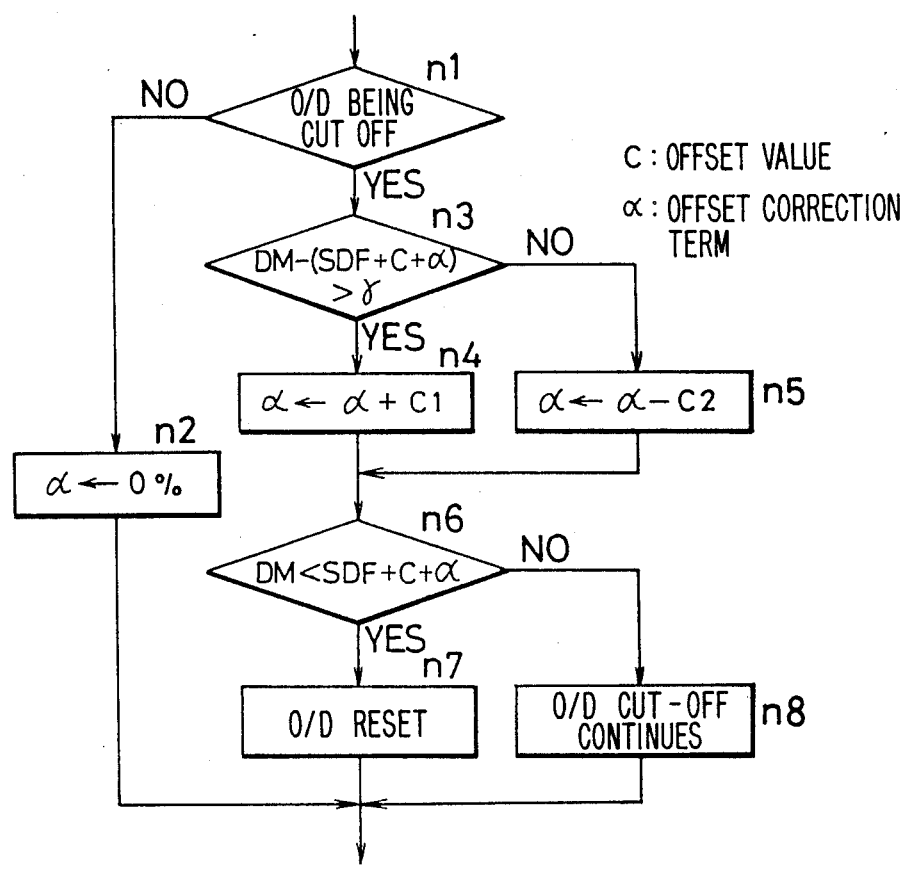
FIG. 12 is a flow chart showing the processing action of the embodiment shown in FIG. 11.

FIG. 12 is a flow chart showing the processing operation of the embodiment shown in FIG. 11. Referring also to FIG. 11, it is judged whether or not the O/D is being cut off at step n1. During O/D traveling, the switch SW4 is shut off, and the offset correction term α is not added to the value SDF+C. That is, during O/D traveling, the operation transfers from step n1 to step n2 to become α=0%. While O/D is being cut off, the operation transfers from step n1 to step n3, and it is judged whether or not the condition $$DM - (SDF + C + \alpha) > \gamma \tag{7}$$

is satisfied. That is, while the O/D is being cut off, the switch SW4 is in conductive state, so that the SDF+C and α are summed up in the summation circuit 36a. From this sum SDF+C+α, the duty ratio mean DM is subtracted in the subtraction circuit 40a, and the resultant balance DM−(SDF+C+α) is applied to the non-inverting input terminal of the comparator CMP5, and the constant γ from the constant setting circuit 40 is given to the inverting input terminal of comparator CMP5. The comparator CMP5 compares the DM−(SDF+C+α) with γ. If γ is less than DM−(SDF+C+α), the operation transfers from step n3 to step n4, and α is added to α+C1. When γ is not less than DM−SDF+C+α), the operation transfers from step n3 to step n5, making α to α+(−C2). That is, when γ is less than DM−(SDF+C+α), the switch SW5 is changed over to the constant setting circuit 41 side by the output of comparator CMP5, and as a result, α and C1 are added up in the summation circuit 43a. When γ is not less than DM−(SDF+C+α), the switch SW5 is changed over to the side of constant setting circuit 42 by the output of comparator CMP5, and α and (−C2) are summed up in the summation circuit 43a.

In this way, when DM−(SDF+C+α)>γ is satisfied (when DM is apart from the resetting conditions by more than γ), α is increased to counteract the difference.

$$\alpha \leftarrow \alpha + C1 \tag{8}$$

To the contrary, when $$DM - (SDF + C + \alpha) \leq \gamma \tag{9}$$

that is, when the difference between DM and resetting condition is not more than γ, α is decreased to expand the difference.

$$\alpha \leftarrow \alpha + (-C2) \tag{10}$$

Then, due to sudden decrease of DM, at step n6, it is judged DM < SDF+C+α and if it is correct, the O/D is reset at step n7. Otherwise, at step n8, the O/D cut-off is continued.

Figure 13:
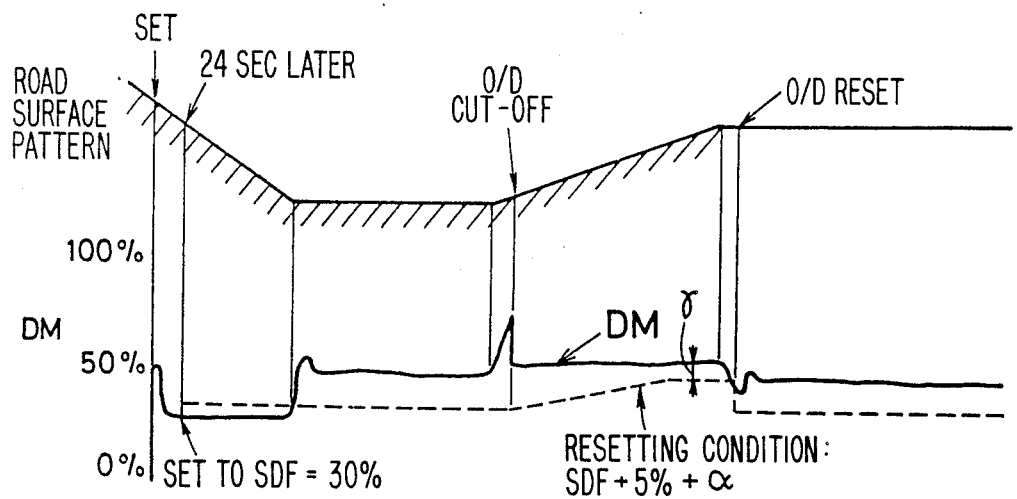
FIG. 13 is an operation explanatory drawing of a conventional O/D control in the traveling state at the steep upslope shown in FIG. 11.
Figure 14:
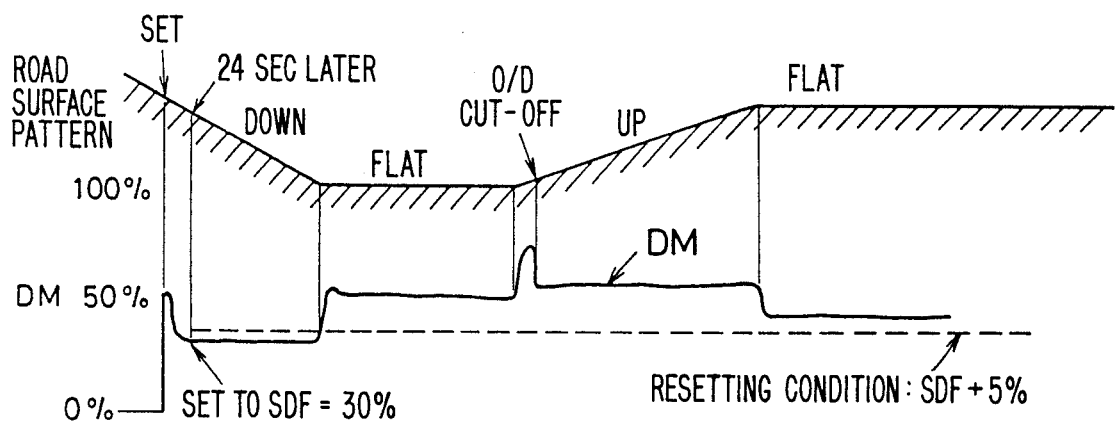
FIG. 14 is an operation explanatory drawing of a conventional O/D control in the traveling state at the steep upslope shown in FIG. 10.

FIG. 13 is an operation explanatory drawing in the condition of γ=10%, C1=C2=0.04%/sec, in which the road surface pattern and setting time are same as those shown in FIG. 14 given later. In the case of FIG. 13, however, since the resetting condition is slowly increasing after cutting off O/D, the O/D resetting is realized due to sudden decrease of DM right after changing over from climbing to flat road.

Incidentally, if γ>0, it may be impossible sometimes to return to O/D when the change rate of DM is small. Accordingly, when setting to γ=0%, the O/D is always reset.

Meanwhile, in the above embodiment, the O/D resetting condition DM < SDF+C is to judge whether or not the preset road surface is close to a flat road state, but the value of the SDF is not necessarily that value on a flat road and there is a hysteresis in the mechanical system, and therefore an offset C is provided in order to have an allowance in the direction easier to reset. If, however, there is a hysteresis over this offset value C or the SDF is set to a very small value due to set operation on a steel slope, this reset condition may not be satisfied on a flat road, and O/D resetting may be disabled.

A practical example of such inconvenience is given in FIG. 14. As shown in FIG. 14, if the vehicle requiring a duty ratio of 50% for cruising a flat road at 80 km/h is set on a downslope and the DM after 24 sec is 30%, SDF is set at 30%, and the resetting condition is SDF+5%=35%. Later, cutting off the O/D on an upslope, and when moving to a flat road, the vehicle is supposed to run at 80 km/h at about DM=40% (since the O/D is cut off, it is smaller than the value of 50% at O/D effective time). In this state, however, the condition of DM < SDF+5% is not satisfied, and it is impossible to return to O/D until reaching a next downslope.

In this embodiment, by using an offset correction term for self-correction of the O/D resetting condition, O/D hunting is prevented, which O/D resetting is guaranteed securely.

Figure 15:
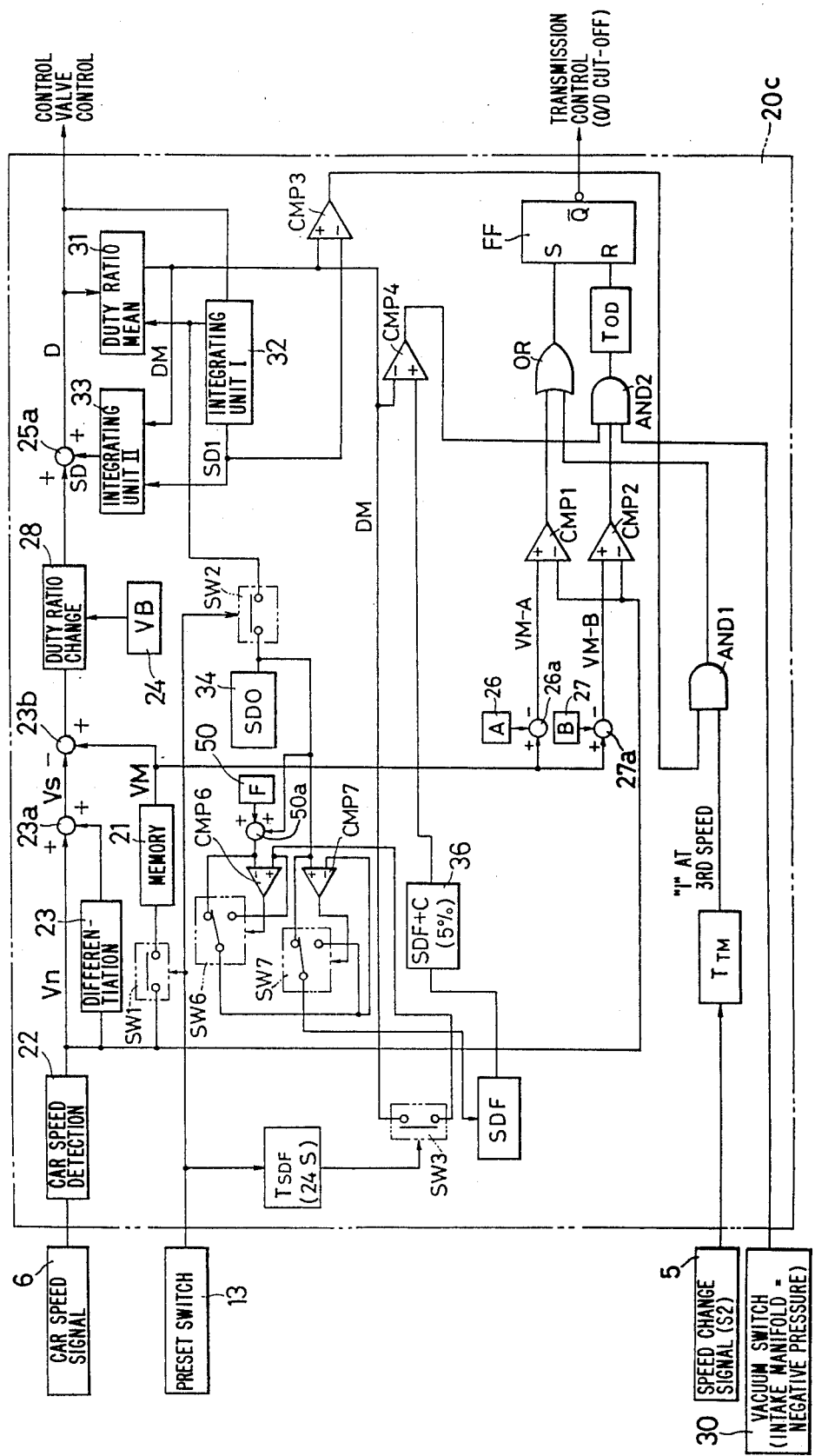
FIG. 15 is a block diagram showing the processing constitution of a control circuit 20c of a further different embodiment of this invention.

FIG. 15 is a block diagram showing the processing constitution of a control circuit 20c of a further different embodiment of this invention. In this invention, the parts similar to or corresponding those in the preceding embodiments are given the identical reference numbers. What is of note here is that this embodiment comprises comparators CMP6, CMP7, constant setting circuit 50 for setting constant F (10%), and switches SW6, SW7. The constant F of constant setting circuit 50 and the initial value $SD_0$ from the initial value setting circuit 34 are summed up in the summation circuit 50a, and the sum $SD_0+F$ is given to the non-inverting input terminal of comparator CMP6. The duty ratio mean DM is fed to the inverting input terminal of the comparator CMP6. Said $SD_0+F$ is fed to one of the individual contacts with the switch SW6, while the DM is fed to the other individual contact of the switch SW6. By the output of comparator CMP6, the switch SW6 is changed over in the switching state.

To the non-inverting input terminal of the comparator CMP7, the initial value $SD_0$ from the initial value setting circuit 34 is fed, while either $SD_0+F$ or DM is fed to the inverting input terminal of the comparator CMP7, depending on the switching state of the switch SW6. At the same, time, the initial value $SD_0$ is fed to one of the individual contacts of the switch SW7, whereas the other individual contact of the switch SW7 is connected to the common contact of the switch SW6. By the output of the comparator CMP7, the switching state of the switch SW7 is changed over. The common contact of the switch SW 7 is connected to the SDF. In this constitution, the SDF can be limited as follows:

$$SD_0 < SDF < SD_0 + F \ (10\%) \tag{11}$$

In this embodiment, incidentally, since the SDF is assumed on a flat road, and when setting on a steep upslope or downslope, there is a large difference in the SDF value as compared with that on the flat road. That is, when set on a steep upslope, the SDF value is larger, and the effect of preventing O/D hunting is sacrificed because the O/D resetting condition is established soon after O/D cutting. To the contrary, when set on a steep downslope, he SDF value is smaller, and as for prevention of O/D hunting, the O/D is not restored if returning to a flat road after O/D cutting.

To avoid such inconveniences, in this invention, it is limited, for example, as follows:

$$SD_0 < SDF < SD_0 + F \ (10\%)$$

This is because of the following reasons. That is, the characteristics of SDF and $SD_0$ may be listed up as follows.

SDF

1. Advantage—Fluctuations of the mechanical system of the vehicle relating to Auto Drive control, such as actuator fluctuation and vehicle fluctuation, are compensated.
2. Disadvantage—The value is reasonable on a flat road or a mild slope, but deviates on a steep slope.

$SD_0$

1. Advantage—There is no deviation to the road surface inclination.
2. Disadvantage—Fluctuations of vehicle mechanical system are not compensated for (being set toward the central value of fluctuations).

So, in order to combined the advantages of both, the SDF is limited at the upper and lower limits of the $SD_0$.

Figure 16:
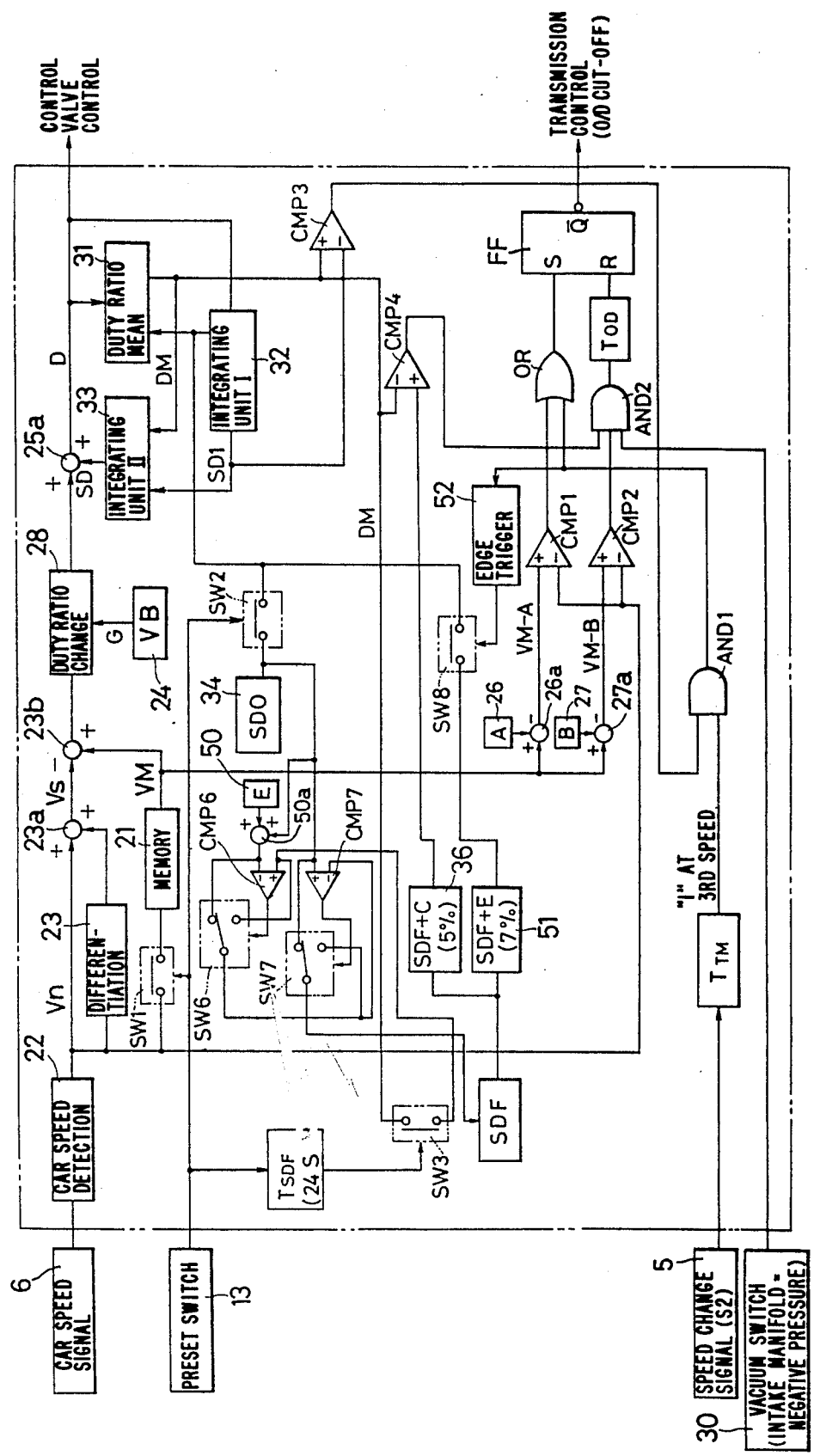
FIG. 16 is a block diagram showing the processing constitution of a control circuit 20d of a further different embodiment of this invention.

FIG. 16 is a block diagram showing the processing constitution of a control circuit 20d of a further different embodiment. In this embodiments, the parts similar to or corresponding to those in the preceding embodiments are given the identical reference numbers. This embodiment comprises a summation circuit 51 for adding a specified offset value E (7%) to the SDF, the value of DM in, for example, 24 seconds after setting the target car speed VM. It also comprises an edge detecting circuit 52 for detecting the rise edge of the output pulse of AND gate AND1, and when this edge detecting circuit 52 detects the edge, a switch SW8 is made to conduct. As a result, SDF+E is fed to the integrating unit 32 and duty ratio mean calculating circuit 31.

Figure 17:
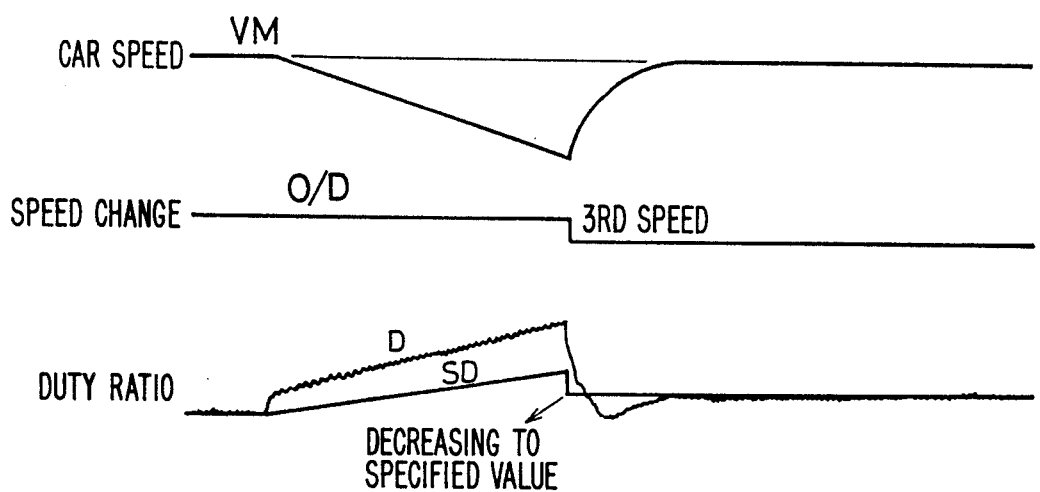
FIG. 17 is an operation waveform diagram showing the O/D cut-off hold state by car speed change detection.

In this embodiment, two integrating devices DM, SD1 are used for integrating correction of set duty ratio SD. DM is a high speed integrating factor, which is expressed as follows:

$$DM = DM + (D - DM)/K \tag{5}$$

where
K: constant
On the other hand, SD1 is a low speed integrating factor expressed as:

$$SD1 = SD1 + \beta \tag{6}$$

where
D > SD1 → $\beta$ = positive constant (0.2%)
D < SD1 → $\beta$ = negative constant (−0.2%)
or $\beta = (D - SD1) \times H$(constant)
Accordingly, using DM and SD1, the set duty ratio SD is expressed as follows:

$$SD = SD1 + (DM - SD1)/n \tag{4}$$

where
n: constant
The SD in the above constant equation usually follows up the duty ratio D as shown in FIG. 17. However, when the O/D is cut off, it is decreased suddenly. For example, DM and SD1 are decreased to the sum of the SDF, the value of DM in 24 seconds after setting the target car speed VM, and the specified offset value (7%), that is, $$SDF + 7\%.$$

This is intended to return to a value close to a required duty ratio on a flat road. Explaining in FIG. 16, when setting, the target car speed VM is stored by switch SW1, and initial value $SD_0$ (the design value determined from the control line of gain G) is given to DM, SD1 by switch SW2. Afterwards, upon the passage of 24 seconds on timer $T_{SDF}$, a switch SW3 is turned on, and the mean duty ratio DM at that time is stored as SDF. Said sum of SDF+7% is created by setting the E of (SDF+E) to 7%. When switch SW4 is turned on, DM, SD1 (both changing from $SD_0$) are decreased to SDF+7%.

It is the rise of the output of AND gate AND1 that turns on the switch SW4. In this embodiment, an OR gate OR is provided so as to set the flip-flop FF from outside, and the speed change signal (S2) from ECU 2 is fed to it. However, in order to exclude the speed change by override or other cases, the flip-flop FF can be set only when two conditions are satisfied, that is: (1) when a speed change signal to the third speed continues for a specified time (e.g. 1 sec), and (2) the relationship between output duty ratio (or the value averaged by filter processing) and the set duty ratio SD is in D > SD.

The condition (1) is detected by timer $T_{TM}$, and (2) is detected by comparator CMP3. The AND gate AND1 detects that the two conditions are established, that is, the speed is actually shifted down from the O/D to the third speed (O/D cut-off), and closes the switch SW8, thereby decreasing DM and SD1 to SDF+7%. Thus, the car speed overshoot may be prevented as shown in FIG. 17.

The set duty ratio SD is varied by monitoring the speed change signal because the common use of this controller (ECU1) and manual transmission (M/T) is considered. That is, when the conditions are satisfied, regardless of the form of the transmission, the flip-flop FF issues an O/D cut-off signal. In the M/T car, however, the O/D is not cut off, and speed change signal is not taken in. Therefore, if this controller is commonly used in an M/T car, correction of the set duty ratio SD to turn on the SW8 is not carried out.

Meanwhile, in this embodiment, SDF+7% may be replaced by $SD_0+7\%$. In this case, however, no correction is made if SDF+7% or $SD_0+7\%$ is higher than DM, SD1 at that time. Or, instead of the above offset value, a correction of SD=SD−20% may be uniformly applied. It may be also possible to correct by different values, by distinguishing between the O/D cut-off by constant speed cruise control and the O/D cut-off by speed change pattern of the transmission. Furthermore, when the integrating correction method employs only one integrating factor γ to set as $$SD = SD + \gamma, \quad (12)$$

only SD may be decreased.

Moreover, as shown in the embodiment in FIG. 15, if the SDF is limited within the relationship of $$SD_0 < SDF < SD_0 + F(10\%), \quad (20)$$

inconvenience by a state of road surface when setting the present car speed may be prevented. In other words, troubles may be avoided, which troubles are no effect of car speed overshoot since the value of SDF is a large value when the preset car speed is set at the upslope, and delayed return of car speed to the target car speed since the value of SDF is a small value, the duty ratio being over returned, when the preset car speed is set at the downslope.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A constant speed cruise control system for a vehicle comprising:
    (a) a controller for automatic speed change for automatically changing over one of the speed stages in a transmission in accordance with a relationship between a throttle valve opening degree and a car speed; and
    (b) a controller for constant speed traveling comprising:
        (b1) a first means for calculating an output duty ratio D by the following equation:

$$D = G(VM - VS) + SD$$

where
        G = gain
        VM = target car speed
        VS = actual car speed
        SD = set duty ratio corresponding to the target car speed VM,
        and for controlling a throttle valve according to the output duty ratio D;
        (b2) a second means for supplying a signal for prohibiting selection of overdrive speed stage in the transmission to the controller for automatic speed change at a time when the car speed lowers by a first predetermined value A from the target car speed VM;
        (b3) a third means for detecting that the car speed recovers up to the value (VM−B) where B is a second predetermined value smaller than the first value A, after the overdrive speed-stage-selection prohibiting signal is supplied from the second means;
        (b4) a fourth means responsive to an output from the third means for supplying a signal for prohibiting selection of overdrive speed stage to the controller for automatic speed change throughout a predetermined period TOD after the car speed recovers up to the value (VM−B), and
        (b5) a fifth means responsive to a signal for shifting down from the overdrive speed stage from the controller for automatic speed change, for enabling the fourth means to thereby prohibit selection of overdrive speed stage when D<SD regardless of controlling by the controller for automatic speed change, and for disabling the fourth means to thereby prevent the fourth means from prohibiting selection of overdrive speed stage when D>SD, wherein the controller for automatic speed change thereby allows the transmission to selectively change over one of the speed stages.

2. A constant speed cruise control system for a vehicle for automatically controlling a car speed so as to be the same as a target car speed, comprising:
    (a) a controller for automatic speed change for automatically changing over one of the speed stages in a transmission in accordance with a relationship between a throttle valve opening degree and a car speed; and
    (b) a controller for constant speed traveling comprising:
        (b1) a first means for controlling a throttle valve opening degree corresponding to an output duty ratio D which is a sum of a set duty ratio SD corresponding to the target car speed VM and a value corresponding to a difference between the target car speed VM and the actual car speed VS, said duty ratio D varying with the car speed VS;
        (b2) a second means for supplying a signal for changing over of a lower speed stage in the transmission to the controller for automatic speed change at a time when the car speed lowers to a value (VM−A) where A is a first predetermined value;
        (b3) a third means for detecting that the car speed recovers up to the value (VM−B) where B is a second predetermined value smaller than the first value A, after said signal is supplied from the second means;
        (b4) a fourth means responsive to an output from the third means for supplying a signal for maintaining selection of the lower speed stage to the controller for automatic speed change throughout a predetermined period TOD after the car speed recovers up to the value (VM−B); and
        (b5) a fifth means responsive to a signal for shifting down from a higher speed stage from the controller for automatic speed change, for enabling the fourth means to thereby maintain selection of the lower speed stage when VM>VS regardless of controlling by the controller for automatic speed change, and for disabling the fourth means to thereby prohibit the fourth means from maintaining selection of the lower speed stage when VM<VS, wherein the controller for automatic speed change thereby allows the transmission to selectively change over one of the speed stages.

* * * * *